(12) United States Patent
Neff et al.

(10) Patent No.: US 6,188,517 B1
(45) Date of Patent: Feb. 13, 2001

(54) THREE-DIMENSIONAL HYBRID SCREEN HAVING MULTIPLE VIEWING SECTIONS

(75) Inventors: Dennis B. Neff; John R. Grismore; Steven B. Wyatt; William A. Lucas, all of Bartlesville, OK (US)

(73) Assignee: Phillips Petroleum Company, Bartlesville, OK (US)

( * ) Notice: Under 35 U.S.C. 154(b), the term of this patent shall be extended for 0 days.

(21) Appl. No.: 09/306,612

(22) Filed: May 6, 1999

(51) Int. Cl.[7] .................................................. G03B 21/56
(52) U.S. Cl. .............................................. 359/451; 359/458
(58) Field of Search ........................... 349/5, 15; 353/7, 353/30, 79, 122; 348/15, 52; 359/451, 458

(56) References Cited

U.S. PATENT DOCUMENTS

| | | |
|---|---|---|
| 3,836,812 | 9/1974 | Bennett ................................ 315/18 |
| 4,350,489 | 9/1982 | Gdovin ................................ 434/40 |
| 5,483,254 | 1/1996 | Powell ................................ 345/87 |
| 5,502,481 * | 3/1996 | Dentinger et al. .................... 348/51 |
| 5,540,229 | 7/1996 | Collet-Billon et al. ......... 128/660.07 |
| 5,762,413 | 6/1998 | Colucci et al. .................... 353/122 |
| 5,908,300 * | 6/1999 | Walker et al. ........................ 434/43 |

* cited by examiner

*Primary Examiner*—Safet Metjahic
*Assistant Examiner*—Etienne LeRoux
(74) *Attorney, Agent, or Firm*—Richmond, Hitchcock, Fish & Dollar

(57) ABSTRACT

A desktop based projector screen having an inner concave display surface upon which a video image or a series of images is projected with a sense of realism comparable with natural viewing of three-dimensional physical reality. The viewing surface combines three concave sections which are derived from solid figures including a dome, cylinder and a plane.

7 Claims, 6 Drawing Sheets

THREE-DIMENSIONAL HYBRID SCREEN HAVING MULTIPLE VIEWING SECTIONS

This invention relates to screens for video projection, and more particularly to a hybrid viewing screen having multiple three-dimensional (3D) sections upon which an image or a series of images is projected with a sense of realism comparable with natural viewing of a 3D physical reality. In another aspect, this invention relates to a desktop based viewing screen having multiple 3D display sections, which allows viewers to use their peripheral vision.

BACKGROUND OF THE INVENTION

Display systems are widely used in diverse image display applications, with most systems employing either planar or substantially planar display surfaces, i.e., flat wall screens which have an inherently limited field of view. While it is possible to extend the observers field of view by simply increasing the vertical and horizontal dimensions of the planar display screen, this expansion generally results in an unacceptable level of distortion of the image. In order to permit users to view objects peripherally, display technology has been developed which generally uses multiple projectors to project adjoining images on adjacent sections of a large wraparound screen so that observers can view objects with depth perception in 3D space.

Accordingly, four screen types are commonly used today to facilitate the many diverse image display applications. These four screen types are: 1) a flat wall, 2) multiple adjacent flat walls, 3) a dome, and 4) a curved wraparound panel, which can be semi-toroidal. All of these display surfaces can include stereo 3D graphics, and some applications require it to be successful.

The reason that no one screen type has persisted is that the different problems and purposes encountered with display systems are best individually addressed by only one of the various screen types mentioned above.

Accordingly, it is an object of this invention to provide a hybrid screen that combines the four screen types in a unitary structure.

A more specific object is to provide a hybrid screen for viewing various 3D combinations of wraparound, dome, flat wall and multi-wall type displays using a single video projector or multiple video projectors.

A still more specific object of this invention is to provide a portable, self-supporting rigid structure with a concave inner viewing surface, which is suitable for positioning on a desktop or on a moveable support table.

Yet another object is to provide an economical viewing surface that gives the viewer a sense of depth perception without requiring stereo projection and stereo glasses.

SUMMARY OF THE INVENTION

According to the present invention the foregoing and other objects and advantages are attained in a multi-section hybrid projection screen structure having an inner concave display surface for viewing video images. The hybrid screen, which is sized to be positioned on a desktop, includes three sections, and the sections can be divided into subsections so that 3D displays covering one or more of the subsections can be viewed. The sections include: a concave semidome ceiling section, a semicylindricular wall section which can be semi-toroidal and having a diameter to match the maximum diameter of the semidome, and a flat semicircular floor section attached to the lower edge of the cylindrical wall.

In a preferred embodiment, the 3D display surface is a unitary construction that combines viewing features of the four commonly used screen types including: a flat wall, multiple adjacent walls, a semidome, and a wraparound. Accordingly, the display surface includes multiple sections for viewing 3D displays. Various combinations of these sections may also be used for viewing, such as the semidome ceiling section together with the flat wall, and further the various sections can be divided into subsections or subareas for detailed viewing.

In use, a video projector, which accepts multiple simultaneous inputs, is connected to a computer to allow the graphic output of the computer to be projected, enlarged, and focused onto the hybrid screen. Accordingly, computer generated signals control the view to be displayed, and the views include section or subsection displays, as well as animation of successive views, which imparts lifelike motion to an object and which is derived from the volume of data, to display information from throughout the data volume.

The multi-section hybrid screen according to this invention can be used for a variety of useful displays, including: 1) a wraparound one-hundred-eighty degree display using only the semicylindrical wall surface, 2) a one-hundred-eighty degree by ninety degree semidome display using only the semidome ceiling surface, 3) a one-hundred-eighty degree wraparound plus floor display using the combination of the semicylindrical wall screen panel plus the floor section, 4) a single wall or three wall display using the semicylindrical wall screen panel divided into one or more subareas, 5) a single wall plus floor, using the combination of the semicylindrical wall panel and the floor, and 6) a silo like shape with a floor, where the entire concave 3D display surface is illuminated.

In another preferred embodiment, a relatively small flat auxiliary screen in the shape of a paddle is provided. This paddle screen can be held by the viewer and positioned within the volume inside of the hybrid screen. An electromagnetic transmitter mounted on the outside of the concave screen surface in combination with a receiver mounted on the paddle screen detect the position and orientation of the moveable paddle throughout the space defined within the hybrid screen, and an interactive image is displayed on the paddle, representing the data that exists at the detected spatial position. In simulation displays the image on the paddle could represent a view corresponding to a rear view mirror. In other applications such as seismic data displays the paddle can display the seismic amplitudes or attributes, e.g., petrophysical properties of rock layers.

Still other objects and advantages of the present invention will become readily apparent to those skilled in this art from the following detailed description and the drawings, wherein there is shown and described only one of the several preferred embodiments of the invention. While the best mode contemplated for carrying out the invention is illustrated as applied to a particularly shaped 3D display surface, it will be realized that the invention is suitable for other and different embodiments, such as projecting video images onto the interior of a hemispherical display surface, the outer surface of a sphere, or a corner between walls. Also several different details of the invention are subject to modification in various obvious respects, all without departing from the invention. Accordingly, the description of the invention and the drawings are to be regarded as illustrative in nature, and not as restrictive.

DETAILED DESCRIPTION OF A PREFERRED EMBODIMENT

Referring first to FIGS. 1 through 5(c), the illustrated projection screen of the present invention will be described in greater detail hereinbelow. In general the presently preferred hybrid screen can be used to display images projected by a video projector, and has obvious utility to many industrial applications including but not limited to:

1) manufacturing design reviews,
2) ergonomic simulation,
3) safety training,
4) video games,
5) cinematography,
6) scientific 3D viewing,
7) medical displays, and
8) seismic data displays.

Figure 1:
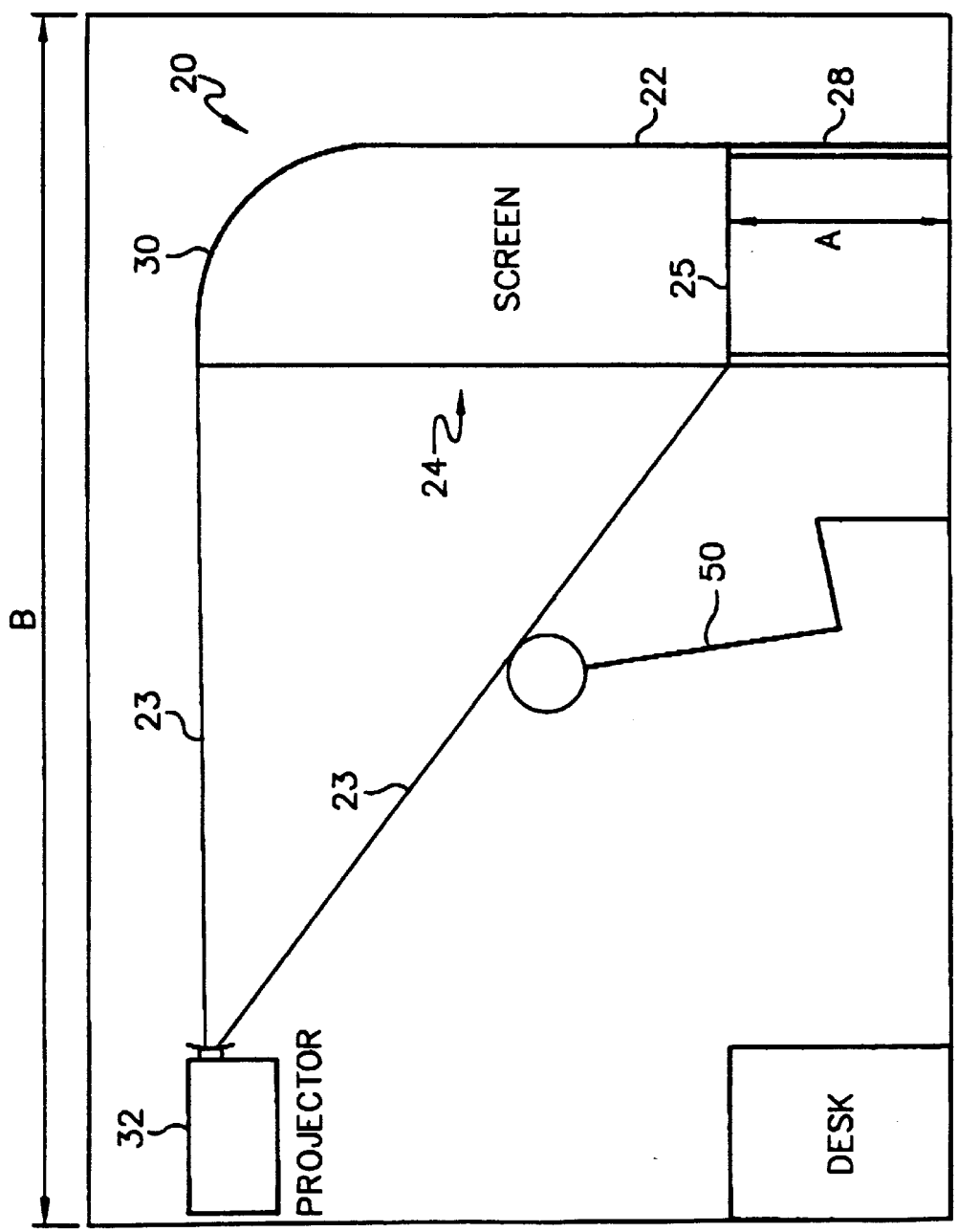
FIG. 1 is a schematic elevation side view of a video projection system located in an average sized domestic room, showing the full screen projection ray viewing volume according to this invention.
Figure 2:
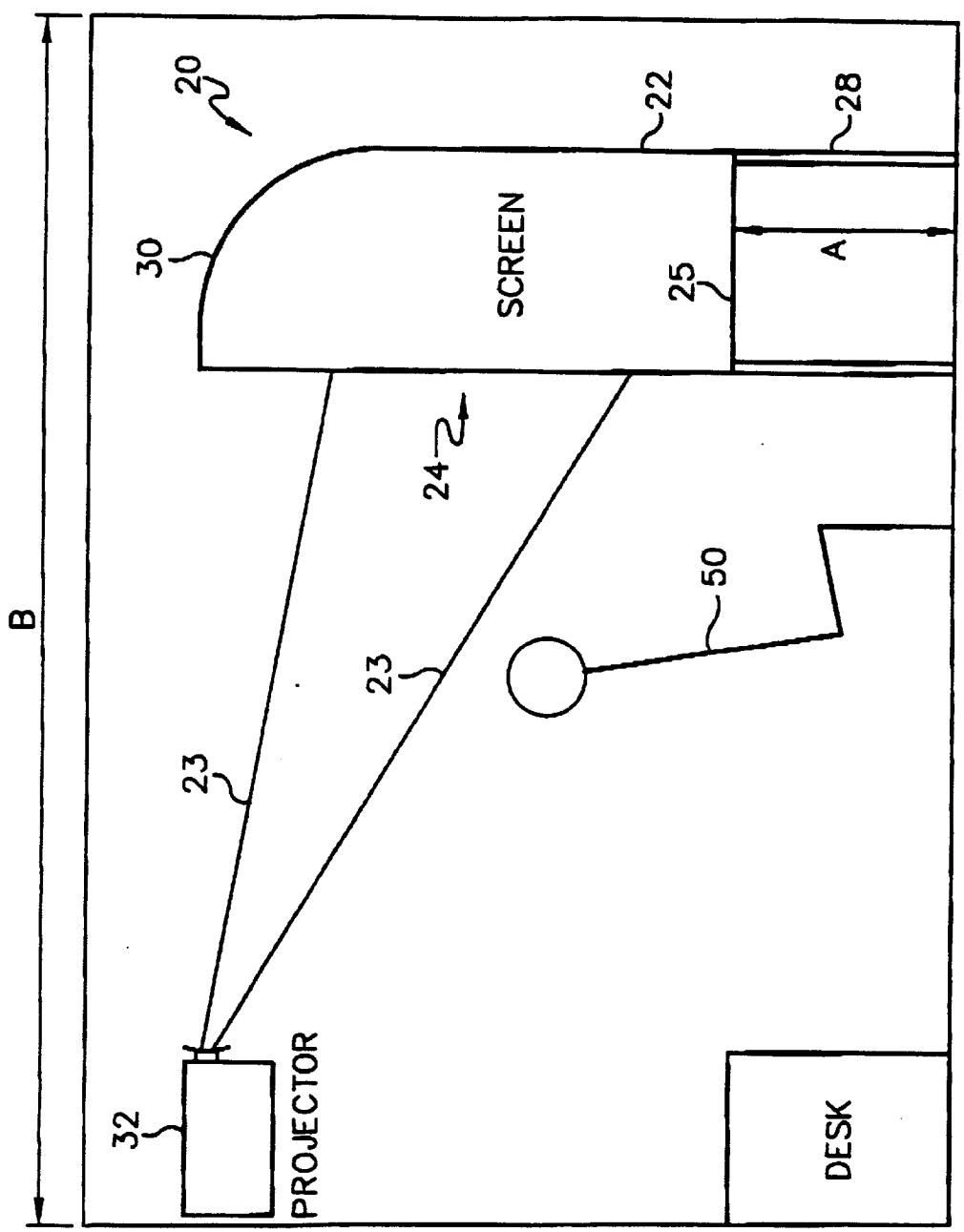
FIG. 2 is a view similar to FIG. 1 showing the projection ray viewing volume for a particular section or subarea.

As best shown in FIGS. 1 and 2 the hybrid projection screen, which is preferably a 3D structure for viewing video images generally indicated at 20, has three major sections forming a concave display surface. The sections include: a concave semidome ceiling section 30, a semicylindrical wall section 22 having a diameter to match the lower edge of the semidome, and a flat semicircular floor section 25. The semicylindrical lower section 22, which is also illustrated in FIG. 5(c), is edgewise joined to a lower edge of the semidome 30. Projection rays, which are illustrated by lines 23, indicate the limits of the viewing volume of the full screen 20 in FIG. 1. In FIG. 2 the projection lines 23 illustrate the viewing volume for one particular section or subarea of the hybrid screen. The concave display surface of the hybrid screen 20 is generally indicated at 24, and includes the semidome section 30, which is elevated above the desk 28 by edgewise mounting on the semicylindrical screen section 22. If desired, the cylindrical lower section can be divided into left, central, and right subarea displays, such that three independent wall views can be simultaneously displayed on the three defined subareas. Still referring to FIGS. 1 and 2, the lower edge of the semicylindrical display screen 22 is attached to the flat semicircular floor section 25, and thus supports the semidome section above the desk 28. Further illustrated in FIGS. 1 and 2 is a human viewer 50 sitting in front of the hybrid screen.

Any suitable material for receiving an image can be used for the construction of the hybrid screen. Readily available materials such as wood, foam board, fiberglass or molded plastic are presently preferred. In the illustrated preferred embodiment, the size of the hybrid screen with reference to the letters A and B in FIG. 1; C, D and E in FIG. 3; F and G in FIG. 5(b), are shown in Table 1 below:

TABLE 1

Typical Hybrid Screen Dimensions

| A | B | C | D | E | F | G |
|---|---|---|---|---|---|---|
| 27" | 14' | 31" | 55 ¾" | 72" | 30" | 6" |

The video projector 32 can be positioned at any suitable distance from the screen 20 to illuminate the full interior surface, or various subareas of the full surface, and is preferably wall mounted as shown in FIGS. 1 and 2. Projection onto the rear of the projection surface is also possible. A commercially available computer workstation compatible projector having high brightness and resolution that is suitable for use with the present invention is a model called Impression 1280, and is available from a company called ASK, in Fredrikstad, Norway.

Figure 3:
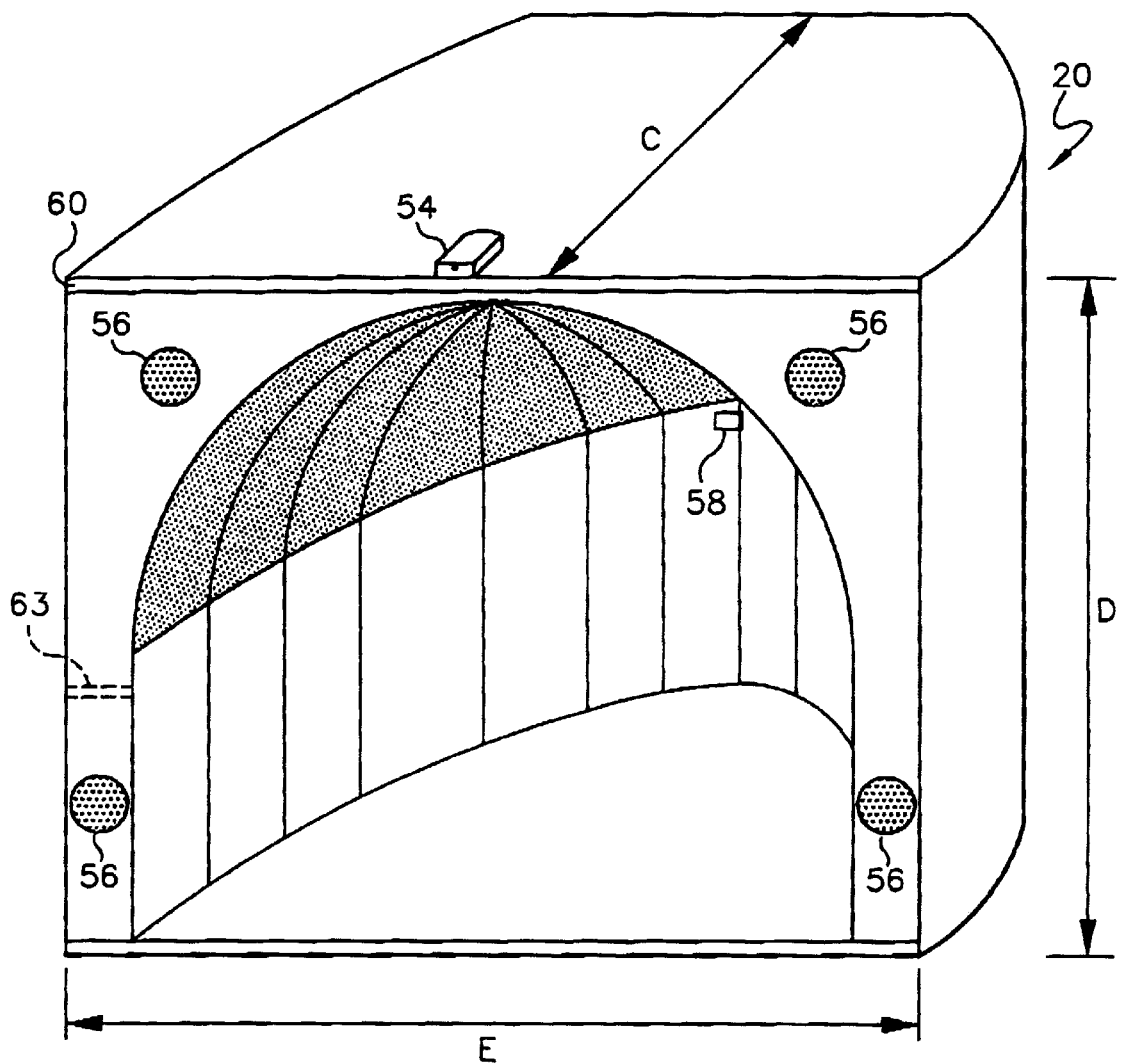
FIG. 3 is a perspective view of the hybrid screen.

FIG. 3 is a perspective view of the hybrid screen 20 showing location of the top horizontal support member 60 and the lower horizontal member 63. FIG. 3 additionally illustrates optional features that can be used with the hybrid screen. These features include a stereo emitter 54, four audio speakers 56, and an electromagnetic transmitter 58. Use of the stereo emitter 54, which is connected directly to the computer, is optional for viewing with the projection system and requires battery powered glasses to detect an infrared signal from the stereo emitter 54. A suitable emitter is a model ESGI available from a company called Stereo Graphics, San Rafael, Calif.

Additional information can be supplied to the user with the four audio speakers. For example, as specific values change in the data volume the pitch or amplitude of the audio tones can change responsive to the position of the paddle or a cursor. Using stereo or quad audio will also allow locating the source of the sound corresponding to the appropriate area of the display.

Figure 4:
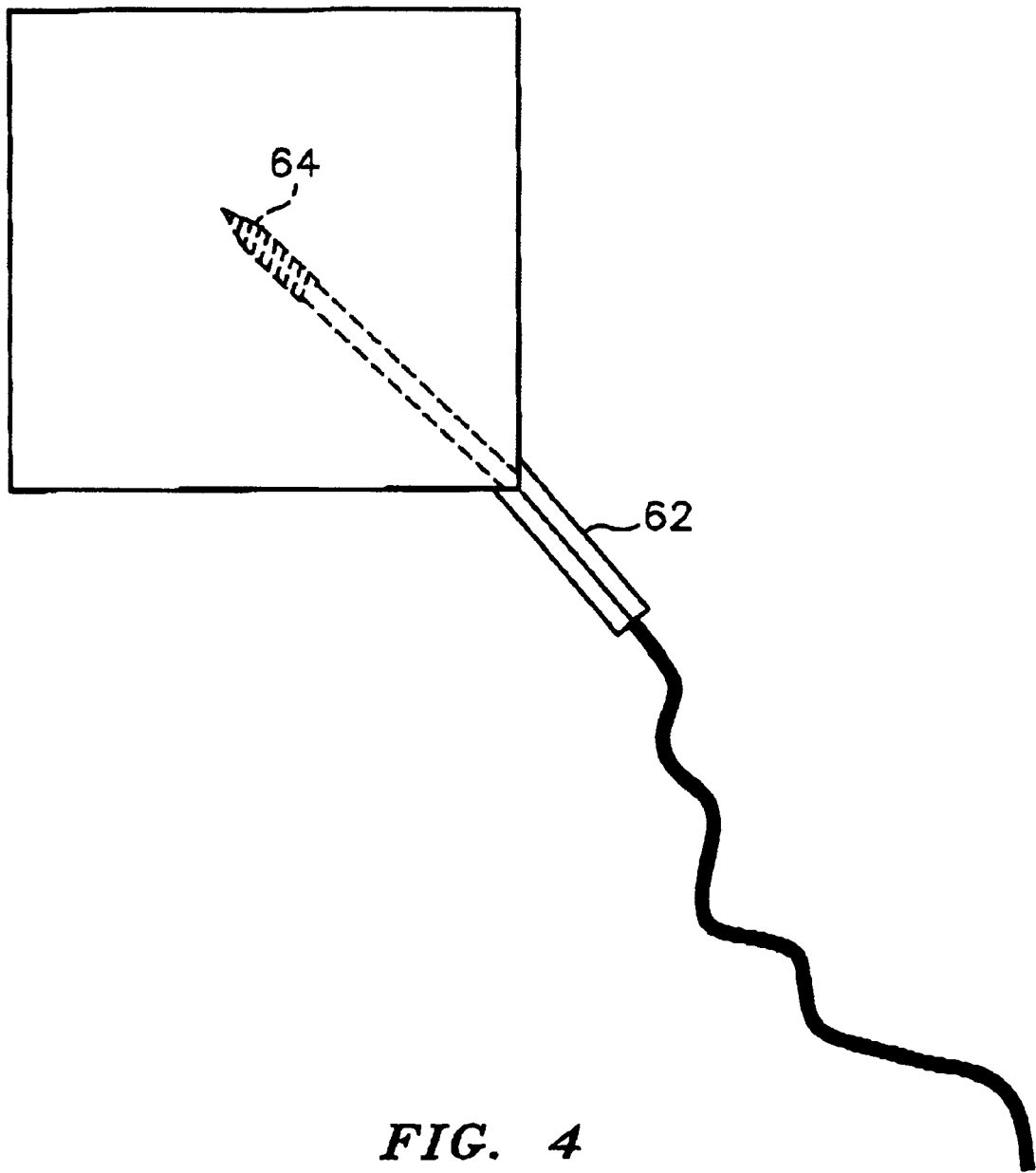
FIG. 4 is a schematic view of the auxiliary paddle screen.

Referring now to FIG. 4, there is illustrated a schematic view of the auxiliary paddle screen, which as previously mentioned, can be detectably positioned throughout the space within the hybrid screen. The preferred size of the paddle screen is about one-foot square and can include other shapes such as a circle or oval attached to a handle 62, and an electromagnetic receiver 64 that is mounted on the back side of the paddle. The receiver 64 cooperates with the transmitter 58 mounted on hybrid screen 20, as shown in FIG. 3, to detect the position of the paddle within the concave volume of the hybrid screen.

Figure 5A:
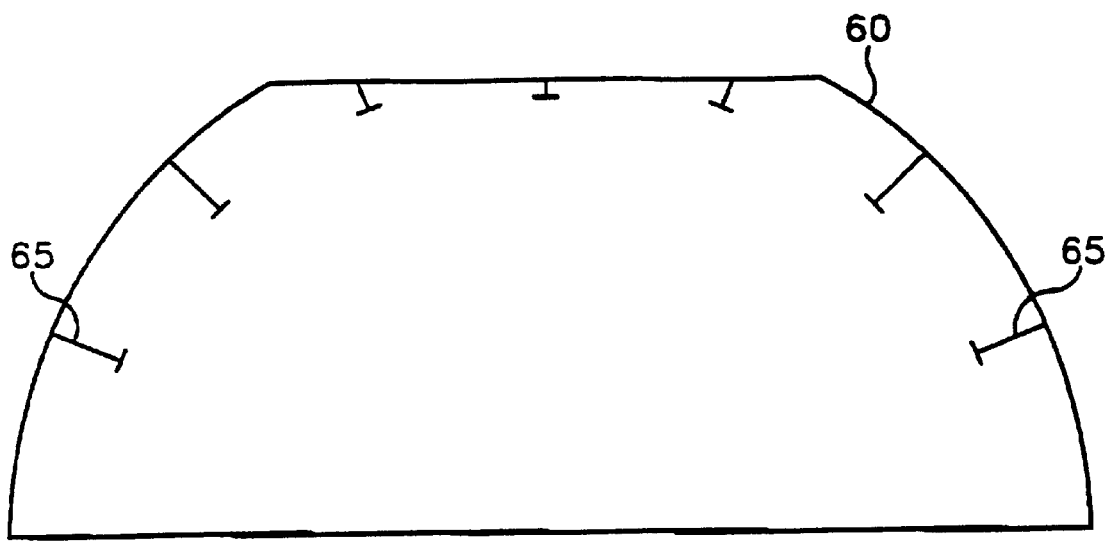
FIG. 5(a)–5(b) are plan views of top and lower horizontal support members respectively for the semidome section, which are positioned as illustrated in FIG. 3.
Figure 5C:
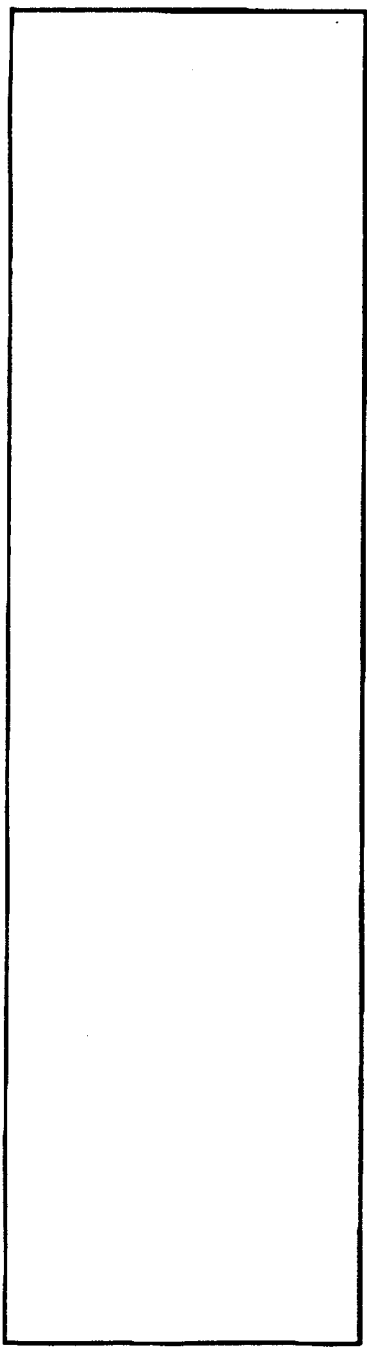
FIG. 5(c) is a front elevation view of the semicylindrical lower screen panel.
Figure 5B:
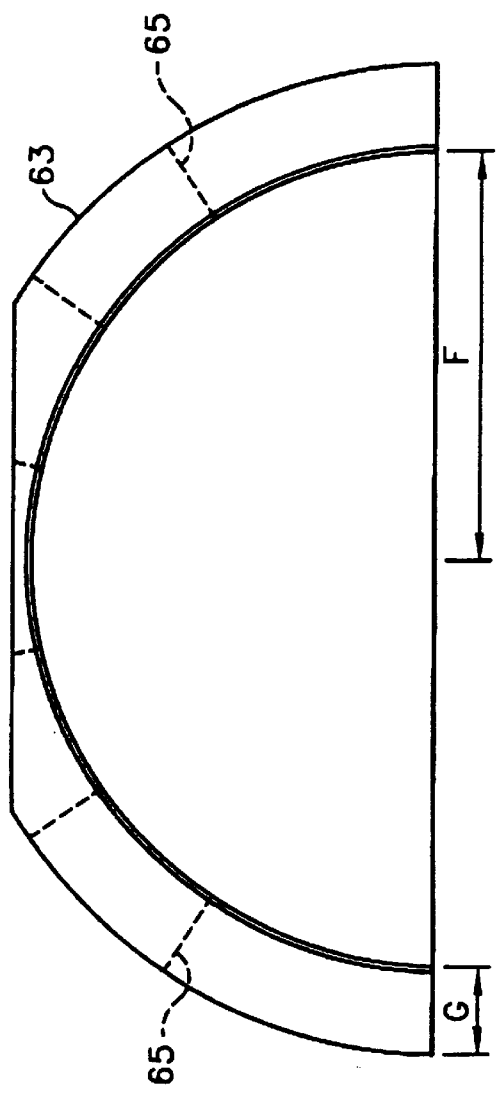

FIGS. 5(a) and 5(b) illustrate the shape of horizontal structural members 60 and 63 for the dome shaped section 30 of the hybrid screen 20, which are positioned as illustrated in FIG. 3. Further, these figures show the position of vertically mounted rib type structure members 65, which in turn support triangular shaped dome panels, not illustrated, that form the concave semidome viewing surface.

In this disclosure, there is illustrated and described only the preferred embodiment of the invention, but as aforementioned, it is to be understood that the invention is applicable for use in various other environments and various other combinations of structures that are all within the scope of the inventive concept as expressed herein.

That which is claimed is:

1. A multi-section hybrid projection screen positionable on a desktop, said hybrid screen having a concave three-dimensional (3D) viewing surface for receiving focused images projected on said concave surface, said hybrid screen comprising:

a) a concave semidome ceiling section;
b) a flat semicircular floor section having a diameter matching the maximum diameter of said semidome; and
c) a semicylindrical wall section having a diameter matching the maximum diameter of said semidome, said wall section being edgewise joined between said ceiling section and said floor section to form a continuous concave viewing surface with said ceiling section and said wall section, and wherein said ceiling section is supported above said desktop when said floor section is positioned on said desktop; and
d) wherein said multi-section hybrid screen displays images projected on at least a subsection of said hybrid screen.

2. Apparatus for viewing a three-dimensional object comprising:
a multi-section hybrid projection screen positionable on a desktop, said hybrid screen having a generally concave three-dimensional (3D) viewing surface for receiving focused images projected on said concave surface, said hybrid screen comprising:
a) a concave semidome ceiling section;
b) a flat semicircular floor section having a diameter matching the maximum diameter of said semidome; and
c) a semicylindrical wall section having a diameter matching the maximum diameter of said semidome, said wall section being edgewise joined between said ceiling section and said floor section to form a continuous concave viewing surface with said ceiling section and said wall section, and wherein said ceiling section is supported above said desktop when said floor section is positioned on said desktop; and
d) at least one video projector for projecting focused images on at least a subsection of said hybrid screen.

3. A multi-section hybrid projection screen in accordance with claim 1, wherein said semidome ceiling section allows viewer peripheral vision up to one-hundred-eighty degrees horizontally and ninety degrees vertically.

4. A multi-section hybrid projection screen in accordance with claim 1, wherein said screen comprises a compact unitary construction made of a material selected from the group of materials consisting of: wood, fiberglass foam board and molded plastic.

5. Apparatus in accordance with claim 2, wherein said video projector includes:
means for accepting a plurality of simultaneous inputs for controlling the view to be projected on said multi-sectional hybrid screen.

6. Apparatus in accordance with claim 5, wherein the surface on which the images are projected is selected from a group of surfaces consisting of a flat wall, multiple adjacent walls, a semidome, a wraparound and combinations thereof.

7. Apparatus in accordance with claim 5, wherein the view to be projected is an animation of successive views to impart lifelike motion to an object.

* * * * *